(12) United States Patent
Hu

(10) Patent No.: US 11,791,894 B2
(45) Date of Patent: Oct. 17, 2023

(54) WIRELESS CENTER DEVICE AND WIRELESS DEVICE FOR DELAY MEASUREMENT, AND WIRELESS COMMUNICATION SYSTEM

(71) Applicant: HUAWEI TECHNOLOGIES CO., LTD., Guangdong (CN)

(72) Inventor: Zhaoyu Hu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 17/554,898

(22) Filed: Dec. 17, 2021

(65) Prior Publication Data

US 2022/0109499 A1 Apr. 7, 2022

Related U.S. Application Data

(63) Continuation of application No. PCT/CN2020/096272, filed on Jun. 16, 2020.

(30) Foreign Application Priority Data

Jun. 17, 2019 (CN) .......................... 201910522196.3

(51) Int. Cl.
*H04B 10/071* (2013.01)
*H04L 7/00* (2006.01)
*H04W 56/00* (2009.01)

(52) U.S. Cl.
CPC ......... *H04B 10/071* (2013.01); *H04L 7/0075* (2013.01); *H04W 56/001* (2013.01)

(58) Field of Classification Search
None
See application file for complete search history.

(56) References Cited

U.S. PATENT DOCUMENTS 9,762,318 B2 * 9/2017 Xu .................. H04L 7/0075
2012/0213508 A1 8/2012 Moynihan
(Continued)

FOREIGN PATENT DOCUMENTS

CN 102457372 A 5/2012
CN 102742190 A 10/2012
(Continued)

OTHER PUBLICATIONS

Hang et al., "Synchronous Sampling Method Based on Measurement of Switch Data Transmission Delay," Automation of Electric Power Systems, Sep. 2016, 2 pages (with English abstract).
(Continued)

*Primary Examiner* — David W Lambert
(74) *Attorney, Agent, or Firm* — Fish & Richardson P.C.

(57) ABSTRACT

This application provides an example wireless center device and an example wireless device for delay measurement, and an example wireless communication system. The example wireless center device includes a delay measurement circuit, configured to obtain a first clock signal of the wireless center device, and a modem configured to send a first optical wave and a second optical wave to the wireless device through a fiber link, where the first optical wave carries the first clock signal, receive the second optical wave that is sent by the wireless device and that carries a second clock signal, receive a second sub optical wave reflected by the wireless device to obtain the second clock signal carried by the second optical wave and a first clock signal carried by the second sub optical wave, and send the second clock signal and the first clock signal to the delay measurement circuit.

8 Claims, 4 Drawing Sheets

(56) References Cited

U.S. PATENT DOCUMENTS

| | | | |
|---|---|---|---|
| 2013/0216218 A1* | 8/2013 | Cao .......................... | H04L 7/04 |
| | | | 398/25 |
| 2015/0372776 A1* | 12/2015 | He ........................ | H04J 3/0682 |
| | | | 398/28 |
| 2018/0054294 A1 | 2/2018 | Rappaport et al. | |
| 2018/0062825 A1* | 3/2018 | Miao ................ | H04B 10/25753 |
| 2018/0076949 A1* | 3/2018 | Mayer .................... | H04B 10/40 |

FOREIGN PATENT DOCUMENTS

| | | |
|---|---|---|
| CN | 109375494 A | 2/2019 |
| CN | 109565344 A | 4/2019 |
| CN | 109756321 A | 5/2019 |
| CN | 109818701 A | 5/2019 |
| JP | 2008182385 A | 8/2008 |
| KR | 20010078643 A | 8/2001 |
| WO | 2013078926 A1 | 6/2013 |

OTHER PUBLICATIONS

Hekkala et al., "Analysis of and Compensation for Non-Ideal RoF Links in Das," IEEE Wireless Communications, vol. 17, No. 3, Jun. 2010, 8 pages.

Office Action issued in Chinese Application No. 201910522196.3 dated May 7, 2021, 8 pages (with English translation).

PCT International Search Report and Written Opinion issued in International Application No. PCT/CN2020/096272 dated Sep. 18, 2020, 15 pages (with English translation).

Sun et al., "Adaptive Delay-Difference Compensation based on Peer Detection for 40-GB/s/ch Optical Virtual Concatenation," 2009 Conference on Optical Fiber Communication, May 29, 2009, 3 pages.

Extended European Search Report issued in European Application No. 20827532.1 dated Jul. 11, 2022, 8 pages.

* cited by examiner

WIRELESS CENTER DEVICE AND WIRELESS DEVICE FOR DELAY MEASUREMENT, AND WIRELESS COMMUNICATION SYSTEM

CROSS-REFERENCE TO RELATED APPLICATIONS

This application is a continuation of International Application No. PCT/CN2020/096272, filed on Jun. 16, 2020, which claims priority to Chinese Patent Application 201910522196.3, filed on Jun. 17, 2019. The disclosures of the aforementioned applications are hereby incorporated by reference in their entireties.

TECHNICAL FIELD

This application relates to the field of wireless communication technologies, and specifically, to a wireless center device and a wireless device for delay measurement, and a wireless communication system.

BACKGROUND

In a long term evolution (long term evolution, LTE) distributed multi-input multi-output (distributed multi-input multi-output, DMIMO) system, clock synchronization precision of each distributed wireless device is a key factor that restricts performance of the DMIMO system. However, due to factors such as different transmission distances between a wireless center device and the wireless devices, temperature drift of components, a thermal expansion and contraction phenomenon of a fiber link, and a processing bias, transmission delays of transmission from the wireless center device to the wireless devices are different. Therefore, clocks of the distributed wireless devices cannot be fully synchronized.

To solve the problem that the clocks of the distributed wireless devices cannot be fully synchronized, an existing compensation mechanism mainly based on a round-trip test mechanism is used. The wireless center device transmits a clock signal to the wireless device. After receiving the clock signal, the wireless device performs phase locking by oscillating a phase-locked loop, to generate a corresponding local clock signal, and then sends the local clock signal back to the wireless center device. The wireless center device measures an interval between a time point for sending the clock signal and a time point for receiving the clock signal, and completes transmission delay compensation of a fiber link based on information about the interval.

However, only a fiber delay during transmission is included in a downlink test, and both fiber delay during the transmission and a clock phase offset between the wireless center device and each wireless device are included in an uplink test. Therefore, a measured uplink and a measured downlink are actually asymmetrical, a relatively large measurement error may be caused when delay compensation is performed in an existing calculation manner in which the delay is halved, and it is relatively difficult to implement clock synchronization.

SUMMARY

Embodiments of this application provide a wireless center device and wireless device for delay measurement, and a wireless communication system, to reduce a measurement error and accurately measure a delay control quantity, thereby implementing clock synchronization.

In view of this, the embodiments of this application provide the following solutions.

According to a first aspect, an embodiment of this application provides a wireless center device for delay measurement, where the wireless center device is used in a wireless communication system, and includes: a delay measurement module, configured to obtain a first clock signal of the wireless center device, and send the first clock signal to a modem module; and the modem module, configured to send a first optical wave and a second optical wave to a wireless device through a fiber link, where the first optical wave carries the first clock signal, receive the second optical wave that is sent by the wireless device and that carries a second clock signal, and receive a second sub optical wave reflected by the wireless device, to obtain the second clock signal carried by the second optical wave and a first dock signal carried by the second sub optical wave, and send the second clock signal and the first clock signal to the delay measurement module, where the second clock signal is determined by the wireless device based on a first clock signal carried by a first sub optical wave transmitted by using the first optical wave, and the second sub optical wave is reflected by the wireless device based on the first optical wave. The delay measurement module is further configured to determine a delay control quantity based on the first clock signal carried by the second sub optical wave, the second clock signal carried by the second optical wave, and the first clock signal of the wireless center device, where the delay control quantity is used to compensate for a service signal. In a downlink, the modem module in the wireless center device separately sends the first optical wave carrying the first clock signal and the empty second optical wave to the wireless device, in an uplink, the wireless center device may receive a part of the first optical wave directly reflected by the wireless device and the second optical wave carrying the second clock signal, and different transmission delays may be measured by using different clock signals carried by different optical waves, so that there is no interference between the different transmission delays, and a measurement error is reduced. Therefore, an accurate delay control quantity is determined.

Optionally, with reference to the first aspect, in a first possible implementation, the modem module may include a first modem unit and a second modem unit. The first modem unit is configured to modulate, in the first optical wave, the first clock signal that is sent by the delay measurement module and that is of the wireless center device, and receive, after sending the first optical wave to the wireless device, the reflected second sub optical wave, to determine the first clock signal carried by the second sub optical wave and send the first clock signal to the delay measurement module. The second modem unit is configured to send the second optical wave to the wireless device, and receive the second optical wave that is sent by the wireless device and that carries the second clock signal, to determine the second clock signal and send the second clock signal to the delay measurement module.

Optionally, with reference to the first possible implementation of the first aspect, in a second possible implementation, the first modem unit may include a first laser, a first electro-optic modulator, and a first photoelectric detector, and the second modem unit may include a second laser and a second photoelectric detector. The first laser is configured to receive the first clock signal that is sent by the delay measurement module and that is of the wireless center device, and send the first optical wave to the wireless device. The first electro-optic modulator is configured to modulate the first clock signal in the first optical wave. The first photoelectric detector is configured to receive and demodulate the second sub optical wave reflected by the wireless device, to determine the first clock signal carried by the second sub optical wave and send the first clock signal to the delay measurement module. The second laser is configured to send the second optical wave to the wireless device. The second photoelectric detector is configured to receive and demodulate the second optical wave that is sent by the wireless device and that carries the second clock signal, to obtain the second clock signal and send the second clock signal to the delay measurement module.

Optionally, with reference to the first aspect, the first possible implementation, and the second possible implementation of the first aspect, in a third possible implementation, the wireless center device may further include a delay compensation module. The delay measurement module is further configured to send the delay control quantity to the delay compensation module, and the delay compensation module is configured to compensate for the service signal based on the delay control quantity.

Optionally, with reference to the third possible implementation of the first aspect, in a fourth possible implementation, the delay compensation module includes an optical variable delay line controller, an electrical variable delay line controller, or a digital delay line processor. An unused delay line controller or processor is used to perform delay compensation on the service signal, thereby providing much operability for clock synchronization between the wireless center device and the wireless device.

According to a second aspect, an embodiment of this application provides a wireless device for delay measurement, where the wireless device is used in a wireless communication system. The wireless device may include: a restoration module, configured to receive a first optical wave sent by a wireless center device through a fiber link, where the first optical wave carries a first clock signal, transmit a first sub optical wave and reflect a second sub optical wave based on the first optical wave, and reflect the second sub optical wave to the wireless center device, to enable the wireless center device to demodulate the second sub optical wave to obtain a first clock signal carried by the second sub optical wave, where a first clock signal carried by the first sub optical wave is used to determine a second clock signal, to enable an electro-optic modulation module to perform modulation in a second optical wave; and the electro-optic modulation module, configured to modulate the second clock signal in the second optical wave after receiving the second optical wave sent by the wireless center device, and send, to the wireless center device, the second optical wave that carries the second clock signal, to enable the wireless center device to perform demodulation to obtain the second clock signal. Different optical waves carrying different clock signals are separately sent to the wireless center device by using the restoration module and the electro-optic modulation module, so that the wireless center device can distinguish different measured delays based on the different optical waves, thereby resolving a phenomenon that a delay control quantity is inaccurate due to interference between the different transmission delays.

Optionally, with reference to the second aspect, in a first possible implementation, the restoration module may include: a photoelectric detector, configured to reflect the second sub optical wave to the wireless center device after receiving the first optical wave sent by the wireless center device, and demodulate the first sub optical wave to obtain the first clock signal carried by the first sub optical wave, to determine a third clock signal and send the third clock signal to a phase-locking unit; and the phase-locking unit, configured to determine the second clock signal based on the third clock signal, and send the second clock signal to the electro-optic modulation module.

According to a third aspect, an embodiment of this application provides a wireless communication system. The wireless communication system may include one wireless center device according to any one of the first aspect or the possible implementations of the first aspect and at least one wireless device according to any one of the second aspect or the possible implementations of the second aspect. The wireless center device is connected to the wireless device through a fiber link.

It can be learned from the foregoing technical solutions that the embodiments of this application have the following advantages.

Because the modem module in the wireless center device separately send, to the wireless device, the first optical wave carrying the first clock signal and the empty second optical wave, the wireless device may directly reflect a part of the first optical wave, namely, the second sub optical wave, to the modem module, so that the modem module performs demodulation to obtain the corresponding first clock signal, and sends the first clock signal to the delay measurement module, to measure an optical fiber round-trip delay. The wireless device may modulate, in the second optical wave, the second clock signal determined based on the first clock signal carried by a remaining part of the transmitted first optical wave, namely, the first sub optical wave, and send the second optical wave to the modem module, so that the modem module performs demodulation to obtain the corresponding second clock signal, and sends the second clock signal to the delay measurement module, to measure a total delay of the optical fiber round-trip delay and a delay offset between the wireless center device and the wireless device. Therefore, different transmission delays may be measured by using different optical waves, so that there is no interference between the different transmission delays, thereby accurately measuring the delay control quantity, reducing a measurement error, and implementing clock synchronization.

DESCRIPTION OF EMBODIMENTS

Embodiments of this application provide a wireless center device and wireless device for delay measurement, and a wireless communication system, to accurately measure a delay control quantity when an uplink and a downlink are asymmetric, to help compensate for a service signal.

The following clearly describes the technical solutions in the embodiments of this application with reference to the accompanying drawings in the embodiments of this application. It is clearly that the described embodiments are merely a part of but not all of the embodiments of this application.

In the specification, claims, and accompanying drawings of this application, the terms "first", "second", "third", "fourth", and the like (if exists) are intended to distinguish between similar objects but do not necessarily indicate a specific order or sequence. It should be understood that the data termed in such a way are interchangeable in proper circumstances, so that the embodiments of this application described herein can be implemented in orders except the order illustrated or described herein. Moreover, the terms "include", "have" and any other variants mean to cover the non-exclusive inclusion, for example, a process, method, system, product, or device that includes a list of steps or units is not necessarily limited to those expressly listed steps and units, but may include other steps or units not expressly listed or inherent to such a process, method, system, product, or device.

For ease of understanding, the following describes a schematic diagram of an architecture applicable to the embodiments of this application.

Figure 1:
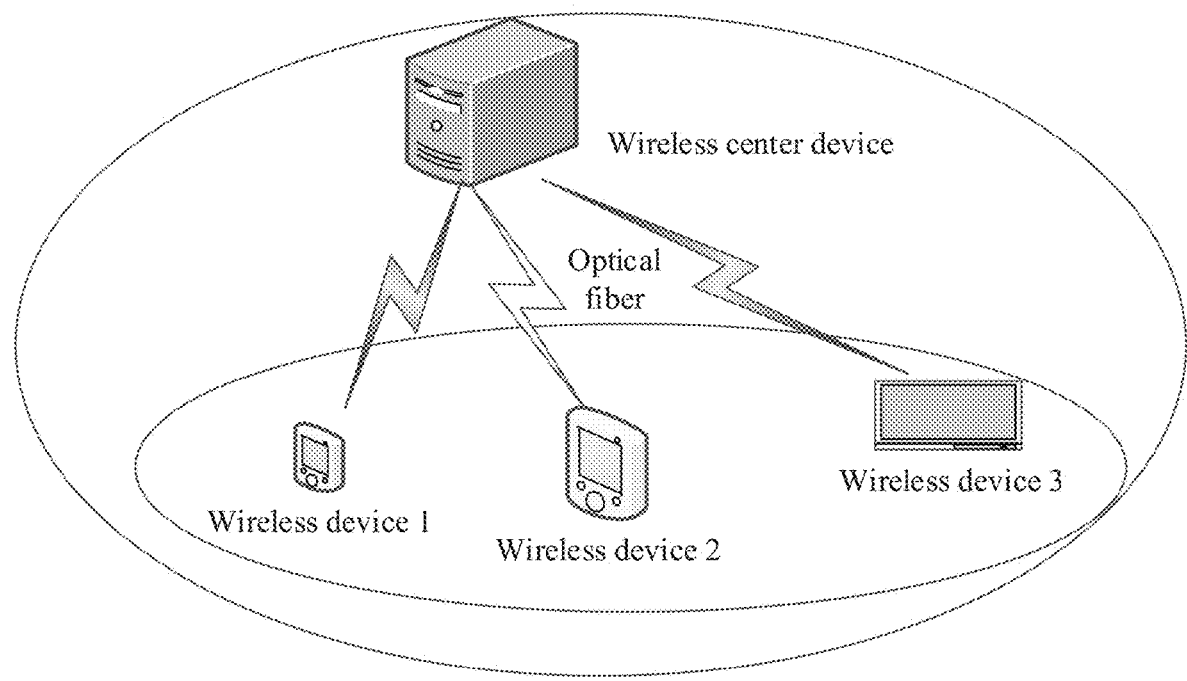
FIG. 1 is a schematic diagram of a system architecture according to an embodiment of this application.

The solutions provided in the embodiments of this application are mainly applied to a wireless communication system. The wireless communication system may be a distributed multi-input multi-output (distributed multi-input multi-output, DMIMO) system. FIG. 1 is a schematic diagram of a system architecture according to an embodiment of this application. As shown in FIG. 1, the architecture may include one wireless center device and at least one wireless device. A quantity of wireless devices is not specifically limited in this embodiment of this application. For example, as shown in FIG. 1, a wireless device 1, a wireless device 2, and a wireless device 3 may be included. However, during actual application, wireless devices such as a wireless device 4 and a wireless device 5 may further be included. The wireless center device may support and control the at least one wireless device, and the wireless center device may be connected to the at least one wireless device by using a cable, for example, an optical fiber or an electric cable. In this embodiment of this application, the optical fiber is mainly used as an example for description. The wireless center device further performs communication through an open common public radio interface (common public radio interface, CPRI) or an infrared (infrared, IR) interface. After obtaining a local clock signal of the wireless center device, the wireless center device may send the local clock signal to the remote wireless device by using the optical fiber. After receiving, from the optical fiber, the local clock signal of the wireless center device, the wireless device may oscillate, output a clock signal on a wireless device side, and feedback the clock signal to the wireless center device, so that the wireless center device compensates, based on a phase offset between the received clock signal on the wireless device side and the local clock signal of the wireless center device, for a service signal for data transmission. In addition, the solutions provided in the embodiments of this application may alternatively be applied to a scenario such as positioning and combination.

The wireless center device may include a baseband processing unit (baseband unit, BBU), a cloud baseband processing unit (cloud baseband unit, Cloud-BB), or may include a next generation NodeB (next generation NodeB, gNB) in a fifth generation (fifth generation, 5G) mobile communication technology new radio (new radio, NR) system, or may include a center device having a measurement function, such as a centralized unit (centralized unit, CU), in a cloud access network (Cloud RAN) system.

The wireless device includes but is not limited to a remote radio unit (remote radio unit, RRU), a subscriber station (subscriber station), a mobile station (mobile station), a mobile station (mobile station), a remote station (remote station), an access point (access point, AP), a remote terminal device (remote terminal), an access terminal device (access terminal), and the like. The wireless device further includes a limited device, for example, a device having low power consumption, a device having a limited storage capability, or a device having a limited computing capability. For example, the wireless device includes an information sensing device, for example, a barcode, a radio frequency identification (radio frequency identification, RFID) a sensor, a global positioning system (global positioning system, GPS), or a laser scanner.

To better understand the solutions provided in the embodiments of this application, some related terms first need to be understood.

Modulation: Modulation may be understood as a process in which a clock signal is processed and added to an optical wave that is used as a carrier, that is, a process in which a phase or frequency of the optical wave is changed to make the clock signal suitable for channel transmission.

Demodulation: Demodulation may be understood as an inverse process of the modulation, and generally includes sine wave demodulation and pulse wave demodulation. In the embodiments of this application, frequency demodulation and phase demodulation in the sine wave demodulation are mainly used, that is, a clock signal is restored from an optical wave. In other words, that a clock signal is restored from an optical wave may be understood as that the clock signal that is originally in electrical domain is restored in optical domain.

Figure 2:
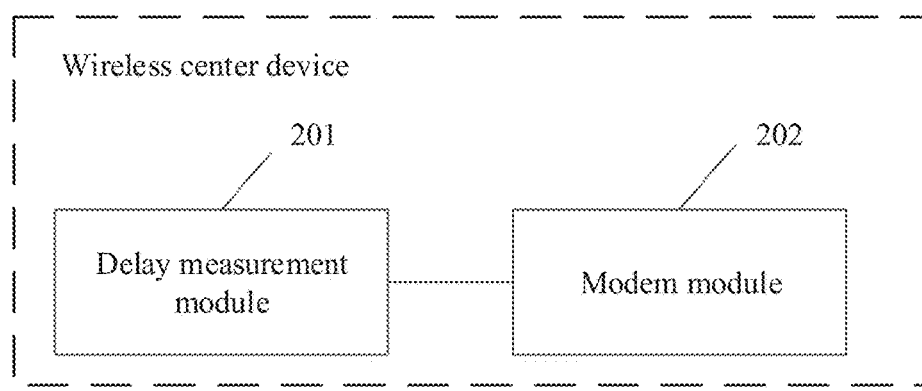
FIG. 2 is a schematic diagram of a structure of a wireless center device for delay measurement according to an embodiment of this application.

The following describes a specific procedure in this embodiment. FIG. 2 is a schematic diagram of a structure of a wireless center device for delay measurement according to an embodiment of this application.

As shown in FIG. 2, the wireless center device, provided in this embodiment of this application, for delay measurement may include a delay measurement module 201 and a modem module 202.

The delay measurement module 201 is configured to obtain a first clock signal of the wireless center device, and send the first clock signal to the modem module 202.

The modem module 202 is configured to send a first optical wave and a second optical wave to a wireless device through a fiber link, where the first optical wave carries the first clock signal, receive the second optical wave that is sent by the wireless device and that carries a second clock signal, and receive a second sub optical wave reflected by the wireless device, to obtain the second clock signal carried by the second optical wave and a first clock signal carried by the second sub optical wave, and send the second clock signal and the first clock signal to the delay measurement module 201, where the second clock signal is determined by the wireless device based on a first clock signal carried by a first sub optical wave transmitted by using the first optical wave, and the second sub optical wave is reflected by the wireless device based on the first optical wave.

The delay measurement module 201 is further configured to determine a delay control quantity based on the first clock signal carried by the second sub optical wave, the second clock signal carried by the second optical wave, and the first clock signal of the wireless center device, where the delay control quantity is used to compensate for a service signal.

In this embodiment, a clock source (CLK Driver) in the wireless center device outputs a local clock signal on the wireless center device side. After the local clock signal is output, the local clock signal is first evenly and equally divided into two clock signals. One clock signal is used to transmit the service signal through a CPRT interface, and the other clock signal is output to the delay measurement module 201. Therefore, the delay measurement module 201 obtains the local clock signal on the wireless center device side, namely, the foregoing described first clock signal.

In this case, the first clock signal is generated in electrical domain and can be transmitted to the remote wireless device only by using the fiber link. Therefore, the first clock signal needs to be converted from electrical domain to optical domain. In this case, the modem module 202 needs to modulate the first clock signal onto an optical wave, that is, modulate the first clock signal onto the foregoing described first optical wave, to send the first optical wave to the remote wireless device through the fiber link. In addition, the modem module 202 further needs to send the second optical wave to the remote wireless device through the fiber link.

It should be noted that, in this embodiment, the second optical wave sent by the modem module 202 to the wireless device is actually an empty optical wave. That is, it should be understood that neither clock signal nor other information is modulated in or carried by the second optical wave sent to the wireless device on the downlink fiber link.

After receiving the first optical wave from the fiber link, the wireless device divides the first optical wave into two sub optical waves. Certainly, the two sub optical waves herein may be evenly and equally divided, or may be divided in an uneven manner. This is not specifically limited herein. One sub optical wave thereof, namely, the foregoing described second sub optical wave, is directly reflected by the wireless device. A purpose of direct reflection is to measure an optical fiber round-trip delay T1 by using a phase offset between the first clock signal carried by the second sub optical wave and the local clock signal of the wireless center device. That is, the optical fiber round-trip delay includes an uplink fiber delay and a downlink fiber delay, and the downlink fiber delay maybe obtained after the optical fiber round-trip delay is divided by 2. Therefore, the wireless device further needs to reflect the second sub optical wave back to the modem module 202 through the fiber link.

The other sub optical wave, namely, the foregoing described first sub optical wave, is an optical wave obtained by the wireless device through transmission. Therefore, the wireless device demodulates the first sub optical wave, to restore the first clock signal carried by the first sub optical wave. In other words, it is understood that the first clock signal is demodulated from optical domain to electrical domain, so that the second clock signal whose phase is the same as that of the first clock signal is generated through oscillation and locked in electrical domain. The oscillation may be understood as adjusting and controlling, based on a voltage of the first clock signal, a frequency and the phase of the second clock signal output by the wireless device. The locking may be understood as converting a phase difference between the first clock signal and the second clock signal into a voltage value, and adjusting a power supply voltage based on the voltage value, to ensure that the output phase difference between the second clock signal and the first clock signal is zero. In this case, the second clock signal may be used as a local clock signal of the wireless device.

To enable the delay measurement module 201 to accurately measure a delay sum T2 of the optical fiber round-trip delay and a clock offset delay between the wireless center device and the wireless device, after receiving the empty second optical wave sent by the modem module 202, the wireless device further needs to modulate the second clock signal to the empty second optical wave. In other words, it may be understood that the second clock signal in electrical domain is modulated onto the second optical wave in optical domain. In this way, the second optical wave carrying the second clock signal can be sent to the modem module 202 of the wireless center device through the fiber link.

After receiving the second sub optical wave reflected back by the wireless device and the second optical wave carrying the second clock signal, the modem module 202 needs to separately demodulate, to electrical domain, the first clock signal that is in the second sub optical wave and that is in optical domain and the second clock signal that is in the second optical wave and that is in optical domain. Therefore, after obtaining the first dock signal and the second clock signal through demodulation, the modem module 202 sends the first clock signal and the second clock signal to the delay measurement module 201.

In this case, the delay measurement module 201 may determine, based on the first clock signal carried by the second sub optical wave, the phase when receiving the first clock signal carried by the second sub optical wave, and obtain the optical fiber round-trip delay T1 with reference to the phase when sending the local clock signal of the wireless center device and based on the phase offset between the two phases. That is, T1 includes both the uplink fiber delay and the downlink fiber delay. Similarly, the delay measurement module 201 may determine, based on the second clock signal carried by the second optical wave, the phase when receiving the second clock signal, and determine, with reference to the phase when sending the local clock signal of the wireless center device, the delay sum T2 of the optical fiber round-trip delay and the clock offset delay between the wireless center device and the wireless device. Therefore, the delay measurement module 201 may determine the delay control quantity $\Delta T$ based on T1 and T2. That is, the delay control quantity includes the one-way downlink fiber delay and the clock offset delay between the wireless center device and the wireless device. Therefore $\Delta T = T1/2 + (T2 - T1)$.

It may be understood that the foregoing described fiber link may be a single optical fiber, two optical fibers, or another optical fiber. This is not specifically limited herein. When the single optical fiber or the two optical fibers is/are used, the wireless center device may further include an optical wavelength division multiplexer. After modulating the first clock signal onto the first optical wave, the wireless center device combines the first optical wave, the second optical wave, and the service signal by using the optical wavelength division multiplexer, and sends the combined first optical wave, the second optical wave, and the service signal to the wireless device by using the single optical fiber or the two optical fibers.

Optionally, the wireless center device may further include a delay compensation module 203, configured to compensate for the service signal based on the delay control quantity. After measuring the delay control quantity $\Delta T$, the delay measurement module 201 may send $\Delta T$ to the delay compensation module 203, so that the delay compensation module 203 performs delay compensation on the service signal used for data transmission, for example, may perform compensation on an optical variable delay line, an electrical variable delay line, or a digital delay line. During actual application, the delay compensation module 203 may alternatively perform compensation on another delay line based on the delay control quantity. This is not specifically limited herein.

Optionally, the delay compensation module 203 may include an optical variable delay line controller, an electrical variable delay line controller, or a digital delay line processor. When the service signal needs to be compensated for on the optical variable delay line, the delay measurement module 201 needs to send the delay control quantity $\Delta T$ to the corresponding optical variable delay line controller, so that the optical variable delay line controller performs delay compensation on the service signal. Similarly, when the service signal needs to be compensated for on the electrical variable delay line, the delay measurement module 201 needs to send the delay control quantity $\Delta T$ to the corresponding electrical variable delay line controller, so that the electrical variable delay line controller performs delay compensation on the service signal. When the service signal needs to be compensated for on the digital delay line, the delay measurement module 201 needs to send the delay control quantity $\Delta T$ to the corresponding digital delay line controller, so that the digital delay line controller performs delay compensation on the service signal. In this case, the digital delay line controller is disposed in the CPRI interface.

In this embodiment of this application, the first optical wave and the second optical wave separately sent by the modem module 202 in the wireless center device to the wireless device may be used to measure different transmission delays, so that there is no interference between the different transmission delays. Therefore, an accurate delay control quantity is determined, a measurement error is reduced, and clock synchronization is implemented.

Figure 3:
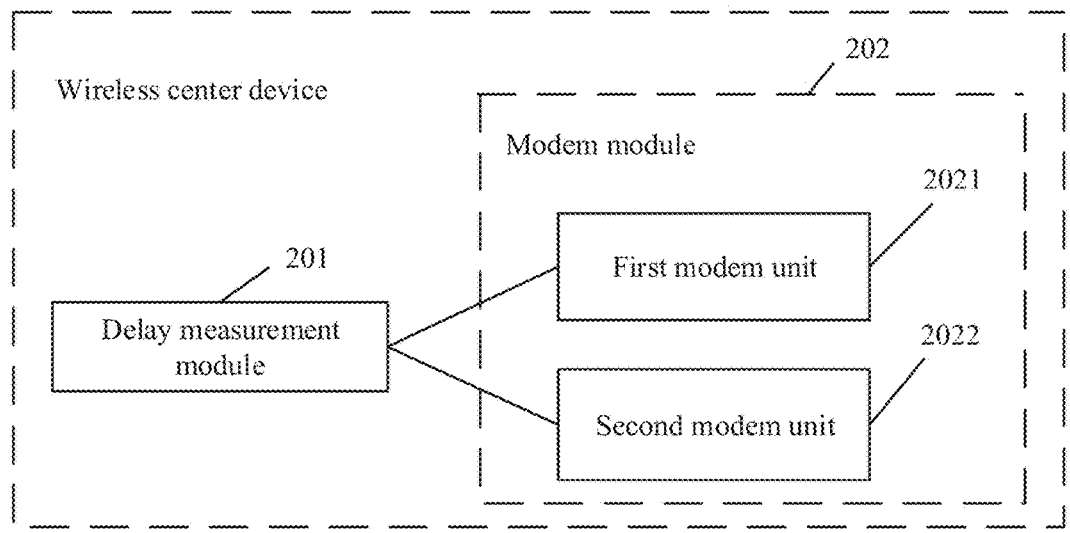
FIG. 3 is another schematic diagram of a structure of a wireless center device for delay measurement according to an embodiment of this application.

FIG. 3 is another schematic diagram of a structure of a wireless center device for delay measurement according to an embodiment of this application.

Based on the embodiment corresponding to FIG. 2, as shown in FIG. 3, another embodiment of the wireless center device for delay measurement provided in this embodiment of this application may further include: The modem module 202 includes a first modem unit 2021 and a second modem unit 2022.

The first modem unit 2021 is configured to modulate, in the first optical wave, the first clock signal that is sent by the delay measurement module 201 and that is of the wireless center device, and receive, after sending the first optical wave to the wireless device, the reflected second sub optical wave, to determine the first clock signal carried by the second sub optical wave and send the first clock signal to the delay measurement module 201. The second modem unit 2022 is configured to send the second optical wave to the wireless device, and receive the second optical wave that is sent by the wireless device and that carries the second clock signal, to determine the second clock signal and send the second clock signal to the delay measurement module 201.

In this embodiment, because the first optical wave and the second optical wave are separately used to measure the different transmission delays, the first modem unit 2021 and the second modem unit 2022 may be separately used to obtain the clock signals through demodulation, and send the clock signals to the delay measurement module 201, to determine a more accurate delay control quantity, so that there is no interference between the different transmission delays Therefore, after the first modem unit 2021 obtains, from the delay measurement module 201, the local clock signal of the wireless center device, namely, the foregoing described first clock signal of the wireless center device, because the first clock signal is generated in electrical domain and can be transmitted to the remote wireless device only by using the fiber link, the first clock signal needs to be converted from electrical domain to optical domain. In this case, the first clock signal needs to be modulated onto an optical wave by using a modulation function of the first modern unit 2021, that is, the first clock signal is modulated onto the foregoing described first optical wave, to send the first optical wave to the remote wireless device by using the fiber link.

Similarly, the second modem unit 2022 also needs to send the second optical wave to the remote wireless device by using the fiber link. It should be noted that, in this embodiment, the second optical wave sent by the second modern unit 2022 to the wireless device is actually an empty optical wave. That is, it should be understood that neither clock signal nor other information is modulated in or carried by the second optical wave sent to the wireless device on the downlink fiber link.

After receiving the first optical wave from the fiber link, the wireless device divides the first optical wave into two sub optical waves. One sub optical wave thereof, namely, the foregoing described second sub optical wave, is directly reflected by the wireless device. A purpose of direct reflection is to measure the optical fiber round-trip delay T1 by using the second sub optical wave. That is, the optical fiber round-trip delay includes the uplink fiber delay and the downlink fiber delay. Therefore, the wireless device further needs to reflect the second sub optical wave back to the first modem unit 2021 through the fiber link.

After receiving the second sub optical wave reflected back by the wireless device, the first modem unit 2021 demodulates the first clock signal in the second sub optical wave from optical domain to electrical domain, to send the first clock signal carried by the second sub optical wave to the delay measurement module 201. Therefore, a process in which after receiving the first clock signal carried by the second sub optical wave, the delay measurement module 201 determines T1 may be understood with reference to FIG. 2, and is not described herein again.

The other sub optical wave, namely, the foregoing described first sub optical wave is an optical wave obtained by the wireless device based on the first optical wave through transmission. Therefore, the wireless device demodulates the first sub optical wave, to restore the first clock signal carried by the first sub optical wave. In other words, it is understood that the first clock signal is demodulated from optical domain to electrical domain, so that the second clock signal whose phase is the same as that of the first clock signal is generated through oscillation and determined in electrical domain. In this case, the second clock signal may be used as a local clock signal of the wireless device. To enable the delay measurement module 201 to accurately measure the delay sum T2 of the optical fiber round-trip delay and the clock offset delay between the wireless center device and the wireless device, after receiving the empty second optical wave sent by the second modem unit 2022, the wireless device further needs to modulate the second clock signal to the second optical wave, and send the second optical wave carrying the second clock signal to the second modem unit 2022 of the wireless center device through the fiber link.

Similarly, after receiving the second optical wave that is sent by the wireless device and that carries the second clock signal, the second modem unit 2022 also needs to demodulate the second clock signal in the second optical wave from optical domain to electrical domain, to send the second clock signal to the delay measurement module 201, Therefore, a process in which after receiving the second clock signal, the delay measurement module 201 determines T2 may be understood with reference to FIG. 2, and is not described herein again.

Therefore, the delay measurement module 201 may determine the delay control quantity ΔT based on T1 and T2. That is, the delay control quantity includes the one-way downlink fiber delay and the clock offset delay between the wireless center device and the wireless device. Therefore, $\Delta T = T1/2 + (T2 - T1)$.

Therefore, delay compensation is performed, based on the delay control quantity ΔT on the service signal used for data transmission. For example, compensation may be performed on an optical variable delay line, an electrical variable delay line, or a digital delay line. During actual application, compensation may alternatively be performed on another delay line based on the delay control quantity. This is not specifically limited herein.

In this embodiment of this application, because the first optical wave and the second optical wave are separately used to measure the different transmission delays, the optical fiber round-trip delay is measured only by using the first optical wave sent by the first modem unit 2021 to the wireless device, and a total delay of the optical fiber round-trip delay and the delay offset between the wireless center device and the wireless device is measured by using the second optical wave sent by the second modem unit 2022 to the wireless device, so that there is no interference between the different transmission delays, thereby determining an accurate delay control quantity, reducing a measurement error, and implementing clock synchronization.

Figure 4:
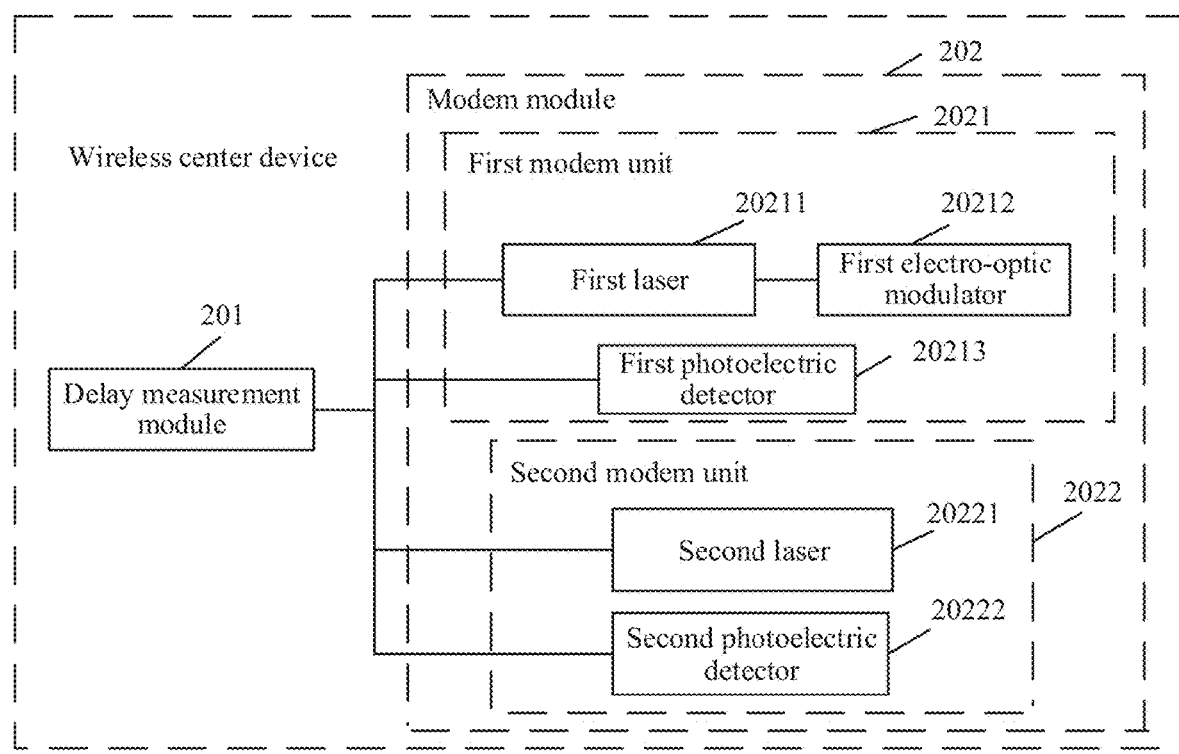
FIG. 4 is another schematic diagram of a structure of a wireless center device for delay measurement according to an embodiment of this application.

FIG. 4 is another schematic diagram of a structure of a wireless center device for delay measurement according to an embodiment of this application.

Based on the embodiment corresponding to FIG. 3, as shown in FIG. 4, another embodiment of the wireless center device for delay measurement provided in this embodiment of this application may further include: The first modem unit 2021 includes a first laser 20211, a first electro-optic modulator 20212, and a first photoelectric detector 20213; and the second modem unit 2022 includes a second laser 20221 and a second photoelectric detector 20222.

The first laser 20211 is configured to receive the first clock signal that is sent by the delay measurement module 201 and that is of the wireless center device, and send the first optical wave to the wireless device. The first electro-optic modulator 20212 is configured to modulate the first clock signal in the first optical wave. The first photoelectric detector 20213 is configured to receive and demodulate the second sub optical wave reflected by the wireless device, to determine the first clock signal carried by the second sub optical wave and send the first clock signal to the delay measurement module 201. The second laser 20221 is configured to send the second optical wave to the wireless device. The second photoelectric detector 20222 is configured to receive and demodulate the second optical wave that is sent by the wireless device and that carries the second clock signal, to obtain the second clock signal and send the second clock signal to the delay measurement module 201.

In this embodiment, because the first optical wave and the second optical wave are separately used to measure the different transmission delays, the first photoelectric detector 20213 and the second photoelectric detector 20222 may be separately used to obtain the clock signals through demodulation, and send the clock signals to the delay measurement module 201, to calculate a relatively accurate delay control quantity, so that there is no interference between the different transmission delays.

Therefore, after the first laser 20211 obtains, from the delay measurement module 201, the local clock signal of the wireless center device, namely, the foregoing described first clock signal of the wireless center device, because the first clock signal is generated in electrical domain and can be transmitted to the remote wireless device only by using the fiber link, the first clock signal needs to be converted from electrical domain to optical domain. Therefore, the first clock signal needs to be sent to the first electro-optic modulator 20212, and is modulated onto an optical wave by using a modulation function of the first electro-optic modulator 20212. That is, the first clock signal is modulated onto the foregoing described first optical wave, to send the first optical wave to the remote wireless device by using the first laser 20211.

Similarly, the second laser 20221 also needs to send the second optical wave to the remote wireless device by using the fiber link.

It should be noted that, in this embodiment, the second optical wave sent by the second laser 20221 to the wireless device is actually an empty optical wave. That is, it should be understood that neither clock signal nor other information is modulated in or carried by the second optical wave sent to the wireless device on the downlink fiber link.

After receiving, by using an uplink fiber link, the second sub optical wave reflected by the wireless device, the first photoelectric detector 20213 converts, by using a demodulation function, the first clock signal carried by the second sub optical wave from optical domain to electrical domain, to send the obtained first clock signal to the delay measurement module 201. A process in which the delay measurement module 201 determines T1 may be understood with reference to FIG. 3, and is not described herein again.

Similarly, after receiving the second optical wave that is sent by the wireless device and that carries the second clock signal, the second photoelectric detector 20222 needs to convert, by using a demodulation function, the second clock signal carried by the second optical wave from optical domain to electrical domain, to send the obtained second clock signal to the delay measurement module 201. A process in which the delay measurement module 201 determines T2 may be understood with reference to FIG. 3, and is not described herein again.

In this embodiment, the first photoelectric detector 20213 and the second photoelectric detector 20222 are respectively used to send, to the delay measurement module 201, the first clock signal carried by the second sub optical wave and the second clock signal carried by the second optical wave, so that the delay measurement module 201 measures the different transmission delays. Therefore, only the first optical wave needs to be used to measure the optical fiber round-trip delay, and only the second optical wave needs to be used to measure the total delay of the optical fiber round-trip delay and the delay offset between the wireless center device and the wireless device, so that there is no interference between the different transmission delays, thereby determining an accurate delay control quantity, reducing a measurement error, and implementing clock synchronization.

Figure 5:
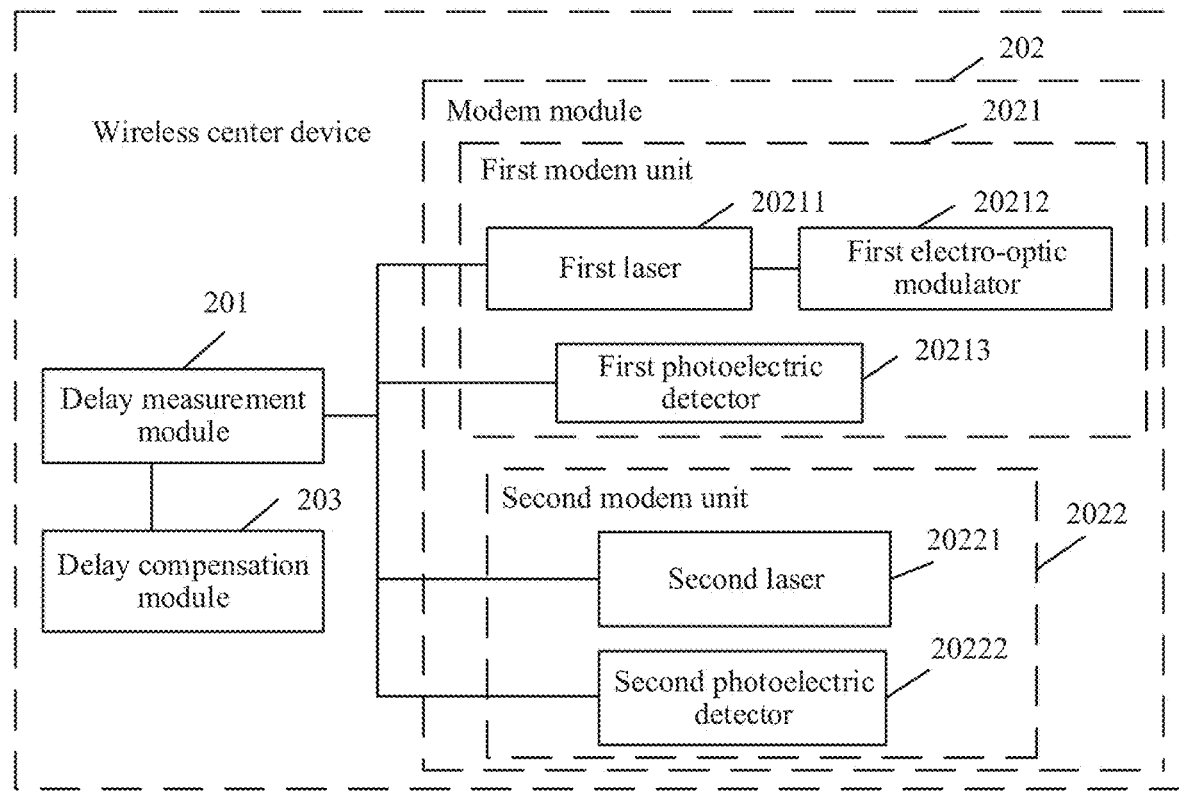
FIG. 5 is another schematic diagram of a structure of a wireless center device for delay measurement according to an embodiment of this application.

FIG. 5 is another schematic diagram of a structure of a wireless center device for delay measurement according to an embodiment of this application.

Based on the embodiments corresponding to FIG. 2 to FIG. 4, as shown in FIG. 5, another embodiment of the wireless center device for delay measurement provided in this embodiment of this application may further include: a delay compensation module 203.

The delay measurement module 201 is further configured to send the delay control quantity to the delay compensation module 203, and the delay compensation module 203 is configured to compensate for the service signal based on the delay control quantity.

In this embodiment, after the delay control quantity is determined, delay compensation may be performed, on the service signal for data transmission, by using the delay compensation module 203, for example, by using an optical variable delay line controller, an electrical variable delay line controller, or a digital delay line processor and by using the delay control quantity, so that a clock synchronization state can be achieved between the wireless center device and the wireless device.

In this embodiment of this application, after the accurate delay control quantity is obtained, the service signal for data transmission is compensated for by using the delay compensation module 203, so that clock synchronization can be implemented when data exchange is performed between the wireless center device and the wireless device.

The foregoing embodiments describe the structure of the wireless center device for delay measurement. The following describes a structure of a wireless device for delay measurement.

Figure 6:
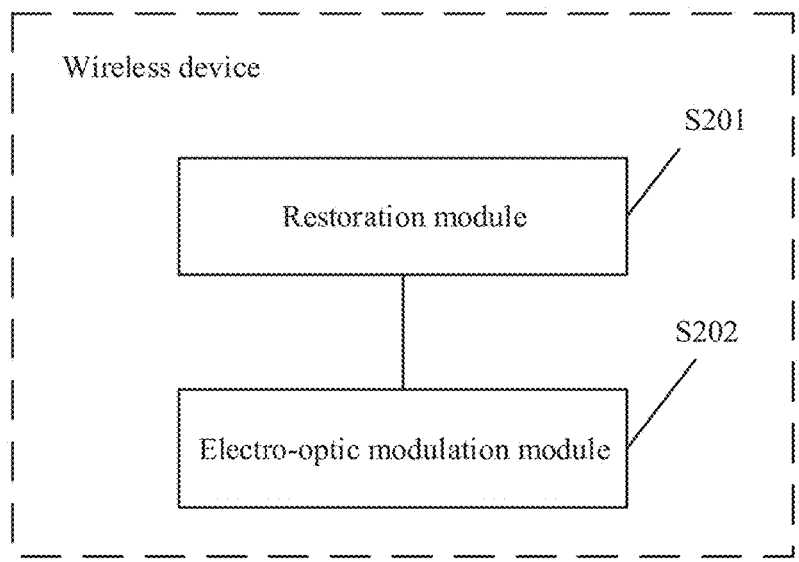
FIG. 6 is a schematic diagram of a structure of a wireless device for delay measurement according to an embodiment of this application.

FIG. 6 is a schematic diagram of a structure of a wireless device for delay measurement according to an embodiment of this application.

As shown in FIG. 6, an embodiment of the wireless device for delay measurement provided in this embodiment of this application may include a restoration module S201 and an electro-optic modulation module S202.

The restoration module S201 is configured to receive a first optical wave sent by a wireless center device through a fiber link, where the first optical wave carries a first clock signal, transmit a first sub optical wave and reflect a second sub optical wave based on the first optical wave, and reflect the second sub optical wave to the wireless center device, to enable the wireless center device to demodulate the second sub optical wave to obtain a first clock signal carried by the second sub optical wave, where a first clock signal carried by the first sub optical wave is used to determine a second clock signal, to enable the electro-optic modulation module S202 to perform modulation in a second optical wave. The electro-optic modulation module S202 is configured to modulate the second clock signal in the second optical wave after receiving the second optical wave sent by the wireless center device, and send, to the wireless center device, the second optical wave that carries the second clock signal, to enable the wireless center device to perform demodulation to obtain the second clock signal.

In this embodiment, when receiving, from the fiber link, the first optical wave sent by the wireless center device, the restoration module S201 divides the first optical wave into two sub optical waves. It may be understood that one sub optical wave thereof may be obtained by the restoration module S201 through reflection on an end face of the restoration module S201, to form the foregoing described second sub optical wave. A purpose of direct reflection is to measure an optical fiber round-trip delay T1 by using the second sub optical wave. That is, the optical fiber round-trip delay includes an uplink fiber delay and a downlink fiber delay. Therefore, the restoration module S201 further needs to return the second sub optical wave to a modern module 202 through the fiber link.

In addition, the restoration module S201 further transmits a remaining sub optical wave, namely, the foregoing described first sub optical wave, based on the first optical wave. Therefore, the restoration module S201 restores, by demodulating the first sub optical wave, the first clock signal carried by the first sub optical wave. In other words, it is understood that the first clock signal is demodulated from optical domain to electrical domain, so that the second clock signal whose phase is the same as that of the first clock signal is generated through oscillation and locked in electrical domain. The oscillation may be understood as adjusting and controlling, based on a voltage of the first clock signal, a frequency and the phase of the second clock signal output by the wireless device. The locking may be understood as converting a phase difference between the first clock signal and the second clock signal into a voltage value, and adjusting a power supply voltage based on the voltage value, to ensure that the output phase difference between the second clock signal and the first clock signal is zero. In this case, the second clock signal may be used as a local clock signal of the wireless device. To enable the delay measurement module 201 to accurately measure a delay sum T2 of the optical fiber round-trip delay and a clock offset delay between the wireless center device and the wireless device, the restoration module S201 further needs to send the second clock signal to the electro-optic modulation module S202.

In this case, after receiving the empty second optical wave sent by the wireless center device, the electro-optic modulation module S202 mainly demodulates, to the second optical wave, the second dock signal received from the restoration nodule S201, so that the second optical wave sent to the wireless center device through the uplink fiber link carries the second clock signal. Therefore, the wireless center device can measure T2.

It may be understood that the foregoing described fiber link may be a single optical fiber, two optical fibers, or another optical fiber. This is not specifically limited herein. When the single optical fiber or the two optical fibers is/are used, the wireless device may further include an optical wavelength division multiplexer. The wireless device may separate the first optical wave and the second optical wave on the single optical fiber or the two optical fibers by using the optical wavelength division multiplexer, combine the second sub optical wave, the second optical wave, and the service signal by using the optical wavelength division multiplexer after the second clock signal is modulated onto the second optical wave, and send the combined second sub optical wave, the second optical wave, and the service signal to the wireless center device by using the single optical fiber or the two optical fibers.

In this embodiment, different optical waves carrying different clock signals are separately sent to the wireless center device by using the restoration module S201 and the electro-optic modulation module S202, so that the wireless center device can distinguish different measured delays based on the different optical waves sent by the wireless device, thereby resolving a phenomenon that the delay control quantity is inaccurate due to the interference between the different transmission delays.

Figure 7:
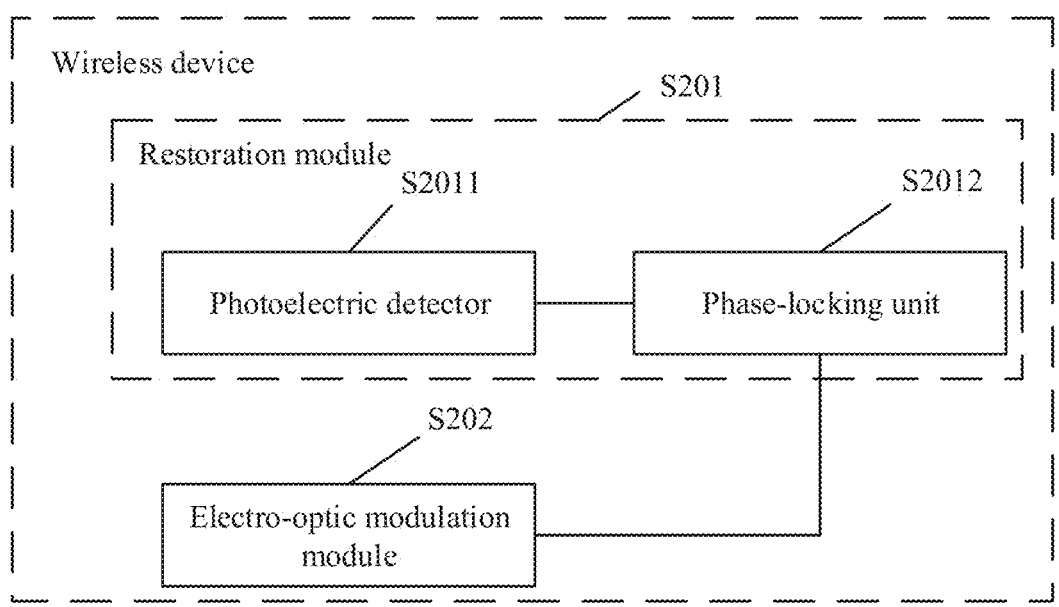
FIG. 7 is another schematic diagram of a structure of a wireless device for delay measurement according to an embodiment of this application.

FIG. 7 is another schematic diagram of a structure of a wireless device for delay measurement according to an embodiment of this application.

As shown in FIG. 7, another embodiment of the wireless device for delay measurement provided in this embodiment of this application may include: The restoration module S201 includes a photoelectric detector S2011 and a phase-locking unit S2012.

The photoelectric detector S2011 is configured to reflect the second sub optical wave to the wireless center device after receiving the first optical wave sent by the wireless center device, and demodulate the first sub optical wave to obtain the first clock signal carried by the first sub optical wave, to determine a third clock signal and send the third clock signal to the phase-locking unit S2012, The phase-locking unit S2012 is configured to determine the second clock signal based on the third clock signal, and send the second clock signal to the electro-optic modulation module S202.

In this embodiment, based on the embodiment described in FIG. 6, because after the first optical wave is sent to the photoelectric detector S2011, a part of the optical wave is directly reflected, and the other part of the optical wave may be used to determine the second clock signal, the phase-locking unit S2012 may be used to determine the second clock signal, to distinguish the two parts. In this way, a delay offset between the wireless center device and the wireless device is determined, to provide a relatively accurate offset for measuring the delay control quantity.

After receiving the first optical wave from the fiber link, the photoelectric detector S2011 reflects a part of sub optical wave, namely, the second sub optical wave, based on the first optical wave, and may transmit the other part of the optical wave, to form the first sub optical wave. The second sub optical wave is directly reflected, on the end face, back to the wireless center device by using the fiber link. For details, refer to FIG. 4. Details are not described herein again.

For the first sub optical wave, the photoelectric detector S2011 demodulates the first sub optical wave. In other words, it may be understood that, the first clock signal is demodulated from optical domain to electrical domain. However, because a case such as random flapping exists due to an influence of a factor such as an environment, the clock signal restored in electrical domain is different from the first clock signal in optical domain. Therefore, in this case, the third clock signal different from the first clock signal is obtained. It may be understood that the third clock signal is a signal determined based on the first clock signal. Therefore, the third clock signal further needs to be sent to the phase-locking unit S2012, so that the phase-locking unit S2012 may lock, in electrical domain based on the third clock signal, the second clock signal whose phase is the same as that of the first clock signal. Therefore, the second clock signal may be used as a local clock signal of the wireless device. To enable the delay measurement module 201 to accurately measure the delay sum T2 of the optical fiber round-trip delay and the clock offset delay between the wireless center device and the wireless device, the phase-locking unit S2012 further needs to send the second clock signal to the electro-optic modulation module S202. A process in which after receiving the empty second clock signal sent by the wireless center device, the electro-optic modulation module S202 modulates the second clock signal may be understood with reference to FIG. 4, and is not described herein again.

In this embodiment, after the second sub optical wave is reflected to the wireless center device by using the photoelectric detector S2011, and the local clock signal, namely, the second clock signal, of the wireless device is accurately locked by using the phase-locking unit S2012, the second optical wave in which the second clock signal is modulated is sent by using the electro-optic modulation module S202, so that the wireless center device may distinguish different measured delays based on the different optical waves, thereby resolving a phenomenon that the delay control quantity is inaccurate due to the interference between the different transmission delays.

What is claimed is:

1. A wireless center device for delay measurement in a wireless communication system, comprising:
    a delay measurement circuit; and
    a modem device, wherein
        the delay measurement circuit is configured to obtain a first clock signal of the wireless center device, and send the first clock signal to the modem device; and
        the modem device is configured to send a first optical wave and a second optical wave to a wireless device through a fiber link, wherein the first optical wave carries the first clock signal;
        receive the second optical wave that is sent by the wireless device and that carries a second clock signal;
        receive a second sub optical wave reflected by the wireless device, to obtain the second clock signal carried by the second optical wave and a first clock signal carried by the second sub optical wave; and
        send the second clock signal and the first clock signal to the delay measurement circuit, wherein the second clock signal is determined by the wireless device based on a first clock signal carried by a first sub optical wave that is transmitted by using the first optical wave, and the second sub optical wave is reflected by the wireless device based on the first optical wave; and wherein
        the delay measurement circuit is further configured to determine a delay control quantity based on the first clock signal carried by the second sub optical wave, the second clock signal carried by the second optical wave, and the first clock signal of the wireless center device, wherein the delay control quantity compensates for a service signal.

2. The wireless center device according to claim 1, wherein the modem device comprises a first modem and a second modern, wherein
    the first modem is configured to modulate, in the first optical wave, the first clock signal that is sent by the delay measurement circuit and that is of the wireless center device, receive, after sending the first optical wave to the wireless device, the reflected second sub optical wave to determine the first clock signal carried by the second sub optical wave, and send the first clock signal to the delay measurement circuit; and
    the second modern is configured to send the second optical wave to the wireless device, receive the second optical wave, that is sent by the wireless device and that carries the second clock signal, to determine the second clock signal, and send the second clock signal to the delay measurement circuit.

3. The wireless center device according to claim 2, wherein the first modem comprises a first laser, a first electro-optic modulator, and a first photoelectric detector, and the second modem comprises a second laser and a second photoelectric detector, wherein the first laser is configured to receive the first clock signal, that is sent by the delay measurement circuit and that is of the wireless center device, and send the first optical wave to the wireless device;

the first electro-optic modulator is configured to modulate the first clock signal in the first optical wave; and the first photoelectric detector is configured to receive and demodulate the second sub optical wave, that is reflected by the wireless device, to determine the first clock signal carried by the second sub optical wave, and send the first clock signal to the delay measurement circuit, and wherein the second laser is configured to send the second optical wave to the wireless device, and the second photoelectric detector is configured to receive and demodulate the second optical wave, that is sent by the wireless device and that carries the second clock signal, to obtain the second clock signal, and send the second clock signal to the delay measurement circuit.

4. The wireless center device according to claim 1, further comprising a delay compensation circuit, wherein the delay measurement circuit s further configured to send the delay control quantity to the delay compensation circuit; and the delay compensation circuit is configured to compensate for the service signal based on the delay control quantity.

5. The wireless center device according to claim 4, wherein the delay compensation circuit comprises an optical variable delay line controller, an electrical variable delay line controller, or a digital delay line processor.

6. A wireless device for delay measurement in a wireless communication system, comprising:

a restoration circuit; and an electro-optic modulator, wherein the restoration circuit is configured to receive a first optical wave sent by a wireless center device through a fiber link, wherein the first optical wave carries a first clock signal, transmit a first sub optical wave, reflect a second sub optical wave based on the first optical wave, and reflect the second sub optical wave to the wireless center device, to enable the wireless center device to demodulate the second sub optical wave to obtain a first clock signal carried by the second sub optical wave, wherein a first clock signal carried by the first sub optical wave determines a second clock signal, to enable the electro-optic modulator to perform modulation in a second optical wave; and the electro-optic modulator is configured to modulate the second clock signal in the second optical wave after receiving the second optical wave sent by the wireless center device, and send, to the wireless center device, the second optical wave that carries the second clock signal, to enable the wireless center device to perform demodulation to obtain the second clock signal.

7. The wireless device according to claim 6, wherein the restoration circuit comprises a photoelectric detector and a phase-locking circuit, wherein the photoelectric detector is configured to reflect the second sub optical wave to the wireless center device after receiving the first optical wave sent by the wireless center device, demodulate the first sub optical wave to obtain the first clock signal carded by the first sub optical wave, to determine a third clock signal, and send the third clock signal to the phase-locking circuit; and the phase-locking circuit is configured to determine the second clock signal based on the third clock signal, and send the second clock signal to the electro-optic modulator.

8. A wireless communication system, comprising one wireless center device and at least one wireless device, wherein the wireless center device comprises a delay measurement circuit and a modem device, wherein the delay measurement circuit is configured to obtain a first clock signal of the wireless center device, and send the first clock signal of the wireless center device to the modem device; and the modem device is configured to:

send a first optical wave and a second optical wave to a wireless device through a fiber link, wherein the first optical wave carries the first clock signal of the wireless center device;

receive the second optical wave that is sent by the wireless device and that carries a second clock signal;

receive a second sub optical wave reflected by the wireless device, to obtain the second clock signal carded by the second optical wave and a first clock signal carried by the second sub optical wave; and send the second clock signal and the first clock signal to the delay measurement circuit, wherein the second clock signal is determined by the wireless device based on a first clock signal carried by a first sub optical wave transmitted by using the first optical wave, and the second sub optical wave is reflected by the wireless device based on the first optical wave, wherein the delay measurement circuit is configured to:

determine a delay control quantity based on the first clock signal carried by the second sub optical wave, the second clock signal carried by the second optical wave, and the first clock signal of the wireless center device, wherein the delay control quantity compensates for a service signal; and wherein the wireless device comprises a restoration circuit and an electro-optic modulator, wherein the restoration circuit is configured to:

receive the first optical wave sent by a wireless center device through the fiber link;

transmit the first sub optical wave and reflect the second sub optical wave based on the first optical wave; and reflect the second sub optical wave to the wireless center device, to enable the wireless center device to demodulate the second sub optical wave to obtain the first clock signal carried by the second sub optical wave, wherein the first clock signal carried by the first sub optical wave determines the second clock signal carried by the second optical wave, to enable the electro-optic modulator to perform modulation in the second optical wave; and the electro-optic modulator is configured to modulate the second clock signal carried by the second optical wave after receiving the second optical wave sent by the wireless center device, and send, to the wireless center device, the second optical wave that carries the second clock signal, to enable the wireless center device to perform demodulation to obtain the second clock signal; and wherein the wireless center device is connected to the wireless device through the fiber link.

\* \* \* \* \*

UNITED STATES PATENT AND TRADEMARK OFFICE
CERTIFICATE OF CORRECTION

PATENT NO. : 11,791,894 B2
APPLICATION NO. : 17/554898
DATED : October 17, 2023
INVENTOR(S) : Zhaoyu Hu Page 1 of 1

It is certified that error appears in the above-identified patent and that said Letters Patent is hereby corrected as shown below:

In the Specification

Column 1, Line 10, please delete "PCT/CN2020/1096272," and insert therefore
-- PCT/CN2020/096272, --;

In the Claims

Column 16, Line 53, Claim 2, please delete "modern," and insert therefore -- modem, --;

Column 16, Line 62, Claim 2, please delete "modern," and insert therefore -- modem --;

Column 17, Line 27, Claim 4, please delete "s" and insert therefore -- is --;

Column 18, Line 3, Claim 7, please delete "carded" and insert therefore -- carried --;

Column 18, Line 29, Claim 8, please delete "carded" and insert therefore -- carried --.

Signed and Sealed this
Thirtieth Day of April, 2024

Katherine Kelly Vidal
*Director of the United States Patent and Trademark Office*